United States Patent [19]

Thrower

[11] Patent Number: 5,780,111

[45] Date of Patent: Jul. 14, 1998

[54] METHOD OF CLEANING AND CONDITIONING SURFACES

[76] Inventor: John H. Thrower, 1231 Belrose La., Charlotte, N.C. 28209

[21] Appl. No.: 926,115

[22] Filed: Sep. 9, 1997

[51] Int. Cl.[6] .............................. B05D 3/12; B05D 1/38; B08B 1/00

[52] U.S. Cl. .................. 427/355; 427/299; 427/402; 427/350; 427/403; 427/418; 427/419.1; 427/419.7; 427/407.1; 134/7; 134/26; 134/29

[58] Field of Search ................... 427/299, 355, 427/402, 350, 403, 418, 419.1, 407.1, 419.7; 134/29, 26, 7

[56] References Cited

U.S. PATENT DOCUMENTS

| | | | |
|---|---|---|---|
| 147,250 | 2/1874 | Elliott | 134/29 |
| 370,551 | 9/1887 | McCarthy | 134/7 |
| 3,529,999 | 9/1970 | Boeniger | 134/2 |
| 4,613,378 | 9/1986 | Christy | 134/2 |
| 4,756,766 | 7/1988 | Thrower | 134/3 |
| 5,462,568 | 10/1995 | Donatelli, Jr. | 51/309 |
| 5,490,883 | 2/1996 | McClaren et al. | 134/3 |

*Primary Examiner*—Michael Lusignan
*Assistant Examiner*—Michael Barr

[57] ABSTRACT

Solution and process for cleaning and conditioning marble and similar substances whereby a first mixture formed from zinc sulfate solution, an abrasive, and a thickener is used to mechanically and chemically clean and prepare the marble for the reception of a second aqueous solution formed of fluorosilicates of the group consisting of the alkaline earth metals and zinc, and a monocarboxylic aliphatic organic acid, such as acetic, and a third mixture formed by the addition of fumed silica and an organic filler such as acrylic or shellac to the second aqueous solution. The first mixture is applied with buffing means, completely flushed with water, and removed. The second solution is applied and partially removed with buffing means, and the third solution is applied and partially removed in the same manner. As a result of these steps, the surface of the treated substance is given a brilliant glass-like finish with increased surface traction.

13 Claims, No Drawings

METHOD OF CLEANING AND CONDITIONING SURFACES

BACKGROUND OF THE INVENTION

This invention relates generally to processes for treating calcareous substances such as marble and the like and more specifically concerns the use of a plurality of intimate mixtures and solutions to clean, smooth, condition and enhance the appearance of such substances.

Various types of materials have been used in the past to clean and maintain calcareous substances, particularly marble; however, this technology has remained at a virtual standstill for the last century until the recent development of new cleaning and conditioning processes.

Polished marble surfaces, and particularly marble floors, soon after installation, become defaced, scratched, and otherwise marred by heavy traffic. In an attempt to protect floor surfaces, engineers have turned to waxes, polymers and synthetic finishes, thus coating the marble with a durable film. Unfortunately, the harsh alkalinity of these coatings and the added alkalinity of strippers that are necessary to remove them cause efflorescence, which further deteriorates the marble. A technique has now been developed to eliminate this detrimental process; however, there is still a need to improve the finish by providing increased surface traction in order to enhance the safety features of that process and provide a more durable finish.

SUMMARY OF THE INVENTION

It is a primary object of the present invention to provide compositions and a method of application thereof that is capable of bringing out the intrinsic beauty of marble and similar substances and maintaining that appearance for a much longer period of time than is possible using conventional methods.

It is another primary object of the present invention to provide the refurbished surface of treated marble and similar substances with a slip-resistant finish to enhance the safety features of the finish and increase the durability thereof.

The objects of the invention are accomplished by providing a process that utilizes an appropriate mixture and solution to grind the surface, the amount of such grinding being determined by a number of factors such as condition and color of the marble, depth of scratches, traffic wear, and levelness of the surface. After removing some calcium carbonate, the freshly ground surface is then chemically treated, ultimately transforming a portion of the remaining calcium carbonate into a fluoride derivative. This phase of the process significantly increases durability, resistance to chipping and scratching, and protection from stains. The end result is a marked reduction in maintenance costs.

Next, a brilliant glass-like finish is returned to the marble which is, in most cases, actually deeper than the original quarry-applied finish. The process results in a marble surface with increased surface traction which lasts much longer than any surface containing a polymer or synthetic coating and will never require stripping.

The method, in particular, comprises the steps of forming intimate mixtures, the first of zinc sulfate, an abrasive, and a thickener, the second of fluorosilicates of the group consisting of alkaline earth metals and zinc and the third of the addition of fumed silica and an organic filler such as acrylic or shellac to the second solution, all three of the mixtures and solutions containing water, applying and removing the first mixture from the surface with flushing and buffing means, applying a diluted solution of the second mixture using buffing means and removing within a limited time by vacuum, applying and removing the undiluted second mixture by first removing a part as excess and treating the balance with buffing means; and thereafter applying and removing the third mixture by first removing a part of it as excess and treating the balance with buffing means.

Additionally, the invention also includes the mixtures and solutions produced for use in the above-described method.

DESCRIPTION OF THE PREFERRED EMBODIMENT

In accordance with the invention, the first intimate mixture consists of essentially zinc sulfate, an abrasive such as from 500 to 800 grit silicon carbide and a discretionary amount of a thickener to gel which increases the viscosity of the solution. The solution is then applied to the marble surface to be treated and buffed with a buffer utilizing a nylon pad, which effectively opens the pores of that surface and prepares it for a second mixture. After the first mixture-coated surface has been buffed, the floor is cleaned and allowed to dry.

A second intimate mixture is prepared which consists essentially of an aqueous fluorosilicates of the group consisting of the alkaline earth metals and zinc, and a monocarboxylic aliphatic organic acid, such as acetic. If any lippage or scratches remain or if further leveling of the surface is needed, a diluted solution of this second mixture is dispensed as a lubricating cooling mixture from the solution tank of a buffing machine using silicon carbide or diamond abrasives, but, if applied, this solution must be completely vacuumed away within a short period of time, preferably, within three minutes, the surface rinsed and allowed to dry. The second mixture now at full strength is thinly applied on the marble surface, covering only small sections of that surface during each application until the entire surface has been treated. After the solution has been applied to a small section, while still damp, that section is then necessarily buffed with a heavy buffer which applies a force of from 0.5 to 1.0 pound per square inch against the surface. From this buffing, the marble sheen appears. By comparison, a normal floor buffer applies a pressure of approximately 0.2 pound per square inch against the surface it is polishing which is insufficient to fully develop the desired chemical reaction. A third intimate mixture is prepared by the addition of fumed silica and an organic filler such as acrylic or shellac to the second mixture, and is applied in an identical manner, as described immediately above, thinly, to a small section at a time, with a heavy buffer, by which a high degree of slip resistance is obtained.

The following example illustrates the invention.

EXAMPLE

A first mixture is formed containing 6 pounds of zinc sulfate, 4 fluid ounces of a non-ionic surfactant such as Tergitol NP-10, 1.0 pound of xanthan gum, 16 pounds of 500 mesh silicon carbide grit, and 5 gallons of water. The solution is applied to the marble surface, clears the pores of the marble, and prepares it for a second mixture.

A second mixture is formed from 7 pounds of magnesium fluorosilicate, 2 pounds of zinc fluorosilicate, 8 fluid ounces of acetic acid, and 4 fluid ounces of Tergitol NP-10, all mixed with 80 pounds of water. If further removal of scratches or lippage is desired, at this point, a finer grinding and hardening procedure may be employed using a 20% solution of the second mixture with a buffing machine as lubrication for either silicon carbide or diamond grinding; however, this solution must be completely removed by vacuuming from the surface within three minutes, the surface rinsed and allowed to dry.

Following this finer grinding, or in the absence of this finer grinding, the full strength second mixture is applied sequentially to small areas and, while still damp, partially removed from each area by buffing means before the next area is coated.

A third mixture is formed from 80 pounds of the second mixture, 1.6 pounds of either shellac or acrylic powder and 56 grams of fumed silica. After mixture, it is applied sequentially to small areas and, while still damp, partially removed from each area by buffing means before the next area is coated, increasing the level of surface traction.

After cleaning and smoothing of a marble surface, prior surface-enhancing methods have been based principally upon reacting calcium hydroxide (lime) with fluosilicates to form a coating on the surface. The present invention causes the removal of essentially all of the calcium hydroxide with zinc sulfate and therefore, does not leave a lime residue on the surface, although, of course, there does remain a residue within the material itself. The sheen and coloring brought forth in the marble surface from the present invention result directly from the removal of calcium hydroxide. The chemical equation representing the zinc sulfate treatment and the introduction of acetic acid is:

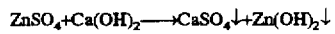

$ZnSO_4 + Ca(OH)_2 \rightarrow CaSO_4 \downarrow + Zn(OH)_2 \downarrow$

Enhancement of the surface is also brought about by the use of magnesium fluorosilicate, zinc fluorosilicate and acetic acid which, in addition to producing valuable calcium ions, also etches the marble surface, thereby enabling a strong bond to be formed.

The acetic acid acidified fluorosilicates are very finely sprayed onto the marble surface and immediately spread and buffed until dry with a steel-wool pad under a buffing machine. The pressure of the machine must be from 0.5 to 1.0 pound per square inch to produce sufficient surface mixing to allow the desired chemical reactions to take place and leave a thin calcium fluorosilicate film. The objective is to produce a thin, transparent, tough, scratch resistant, hard, inorganic film as a base as opposed to applying a temporary organic coating of wax or the like as is done in conventional applications. The simultaneous chemical reactions representing the development of the fluorosilicates are:

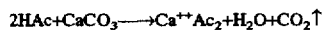

$2HAc + CaCO_3 \rightarrow Ca^{++}Ac_2 + H_2O + CO_2 \uparrow$

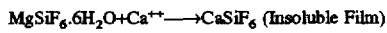

$MgSiF_6 \cdot 6H_2O + Ca^{++} \rightarrow CaSiF_6$ (Insoluble Film)

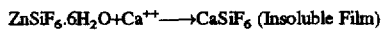

$ZnSiF_6 \cdot 6H_2O + Ca^{++} \rightarrow CaSiF_6$ (Insoluble Film)

A process similar in nature to that disclosed above can be used in those instances where the marble surface is not radically worn or where the previously described process has been used one to two years previously and a lesser application is needed to bring the marble surface to a suitable finish. Such an application can be formulated by the following chemical process:

$CaAc_2 + MgSiF_6 + ZnSiF_6 \rightarrow CaSiF_6$ (Insoluble Film)

Sequentially applied aqueous solutions to the marble surface of calcium acetate and aqueous solutions of magnesium and/or zinc silicofluorides reacting with buffing means will function satisfactorily to restore the depth of gloss of the marble and otherwise enhance its appearance.

While the example in this application includes the preferred use of a combination of magnesium and zinc fluorosilicates in an 80:20 ratio, either can be used alone because they both will react with the calcium ions in the calcium acetate to produce an insoluble calcium fluorosilicate film. The calcium fluorosilicate film produced from calcium acetate solution and either zinc fluorosilicate or magnesium fluorosilicate alone is satisfactory, but the marble colors developed are not as deep or as dark as when using the combination of zinc fluorosilicate and magnesium fluorosilicate blended together. The only compensation that must be made to make either work alone is to compensate for the molecular weight differences between zinc and magnesium compounds. For example, one pound of $ZnSiF_6 \cdot 6H_2O$ is chemically equivalent to 0.87 pound of the $MgSiF_6 \cdot 6H_2O$ and can be interchanged by that ratio.

Long-term maintenance costs associated with the application of the present invention are about 25% of those associated with conventional waxing, stripping and buffing operations.

Although the present invention has been described in some detail by way of illustration and example for purpose of clarity of understanding, it is to be understood that certain changes and modifications may be made within the spirit of the invention and the scope of the appended claims.

What is claimed is:

1. A coating, cleaning, and conditioning process for marble comprising the steps of: applying a first mixture consisting essentially of zinc sulfate, an abrasive, a thickener and a wetting agent to the surface to be treated; removing the mixture with buffing means and water; forming a second mixture consisting essentially of fluorosilicates of the group consisting of the alkaline earth metals and zinc, a monocarboxylic aliphatic organic acid and a wetting agent; applying a 20% solution by volume of the second mixture to the surface to be treated by buffing means utilizing abrasive means; removing this solution by vacuuming; applying the full strength second mixture to the surface to be treated; partially removing the second mixture with buffing means to form an insoluble film of calcium fluorosilicate that restores the depth of gloss of the marble; applying a third mixture consisting essentially of the second mixture, fumed silica and an organic filler to the surface to be treated; and partially removing this third mixture with buffing means to increase the slip-resistance of the surface.

2. The process as claimed in claim 1 wherein the second mixture buffing means includes a buffer capable of exerting from 0.5 to 1.0 pound per square inch against the second mixture-coated surface to the treated.

3. The process as claimed in claim 1 wherein the first mixture contains from 0.5 to 1.7 pounds of zinc sulfate and from 1 to 3 pounds of abrasive per gallon of water.

4. The process as claimed in claim 1 wherein the second mixture contains from 0.4 to 0.8 pound of magnesium fluorosilicate and from 0.1 to 0.2 pound of zinc fluorosilicate per gallon of water.

5. The process as claimed in claim 1 wherein the second mixture contains from 0.5 to 1.0 pound of magnesium fluorosilicate per gallon of water.

6. The process as claimed in claim 1 wherein the second mixture contains from 0.6 to 1.0 pound of zinc fluorosilicate per gallon of water.

7. The process as claimed in claim 1 wherein the abrasive in the first mixture is from 500 to 800 grit silicon carbide abrasive.

8. The process as claimed in claim 1 wherein the thickener is xanthan gum.

9. The process as claimed in claim 1 wherein the abrasive is silicon carbide.

10. The process as claimed in claim 1 wherein the abrasive is diamond.

11. The process as claimed in claim 1 wherein the wetting agent is non-ionic.

12. The process as claimed in claim 1 wherein the organic filler of the third mixture is acrylic.

13. The process as claimed in claim 1 wherein the organic filler of the third mixture is shellac.

* * * * *